May 18, 1926. 1,585,139
W. A. EDWARDS
FUEL REATOMIZER FOR GAS ENGINES
Filed Oct. 6, 1921 2 Sheets-Sheet 1
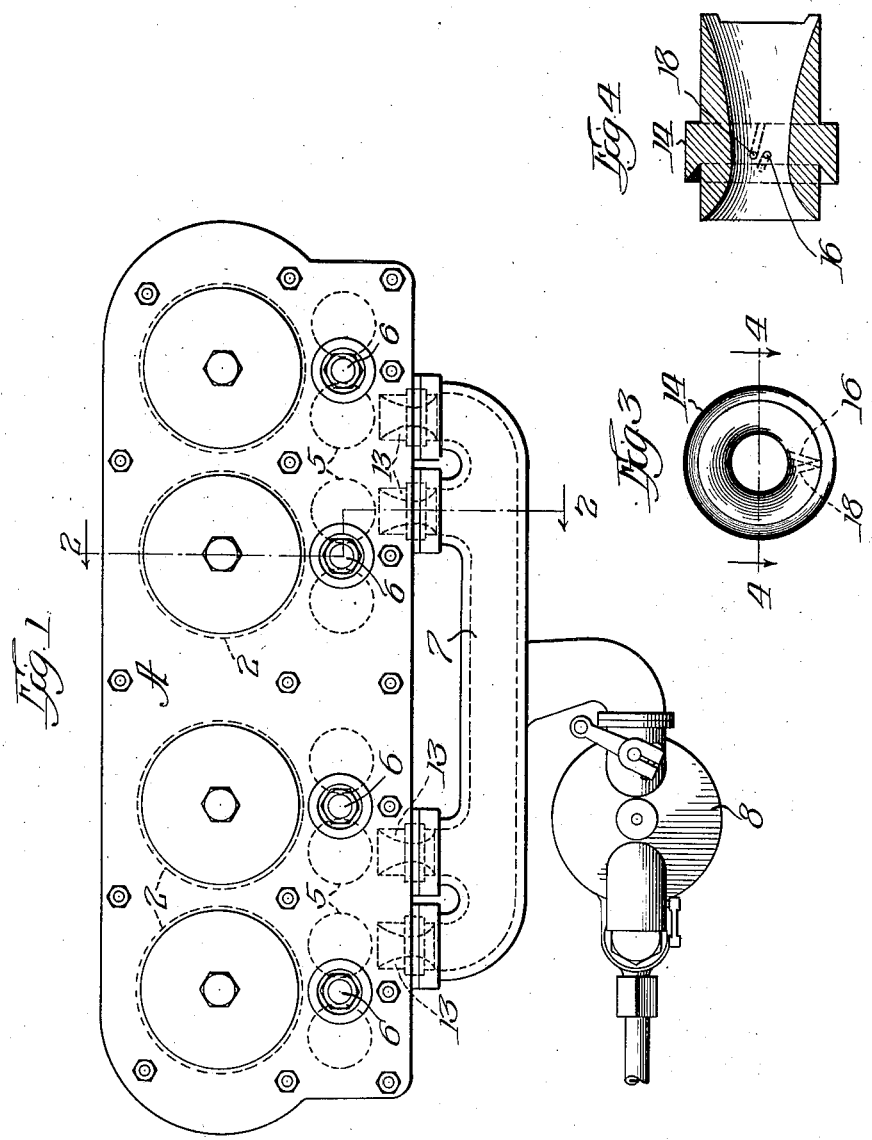
Witness: Inventor
Geo. E. Davison William A. Edwards
By Ira J. Wilson Atty.

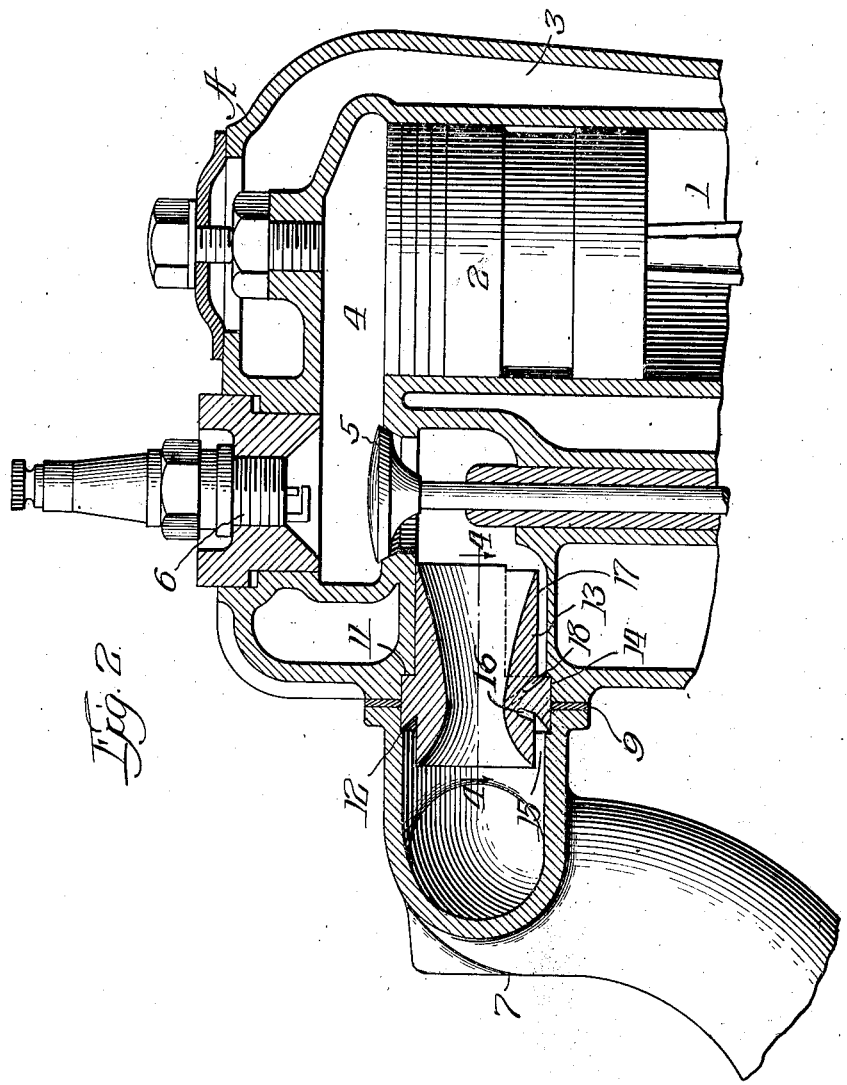

Patented May 18, 1926.

1,585,139

UNITED STATES PATENT OFFICE.

WILLIAM A. EDWARDS, OF CHICAGO, ILLINOIS, ASSIGNOR OF THREE-FOURTHS TO CHARLES W. GILLETT, OF CHICAGO, ILLINOIS.

FUEL REATOMIZER FOR GAS ENGINES.

Application filed October 6, 1921. Serial No. 505,713.

This invention relates in general to internal combustion engines, and has more particular reference to a means for increasing the efficiency of the engine by converting the liquid fuel into gaseous condition prior to its entrance into the cylinders so that the maximum power may be secured from the fuel.

The carbureters customarily employed on gas engines with a view of mixing the liquid hydro-carbon fuel with air so as to produce a combustible mixture are located some considerable distance from the cylinders and are connected to the cylinders by means of an intake manifold. While the jets and various devices employed in the carbureters to atomize the fuel do, to a greater or less degree, perform the function for which they were designed, nevertheless, there inevitably is present in the manifold an appreciable and detrimental quantity of unatomized liquid fuel which, if delivered in this condition into the cylinders, results in the formation of carbon, fouling of the spark plugs and a deterioration of the lubricating oil in the crank case.

This condensate results from the fact that some of the fuel particles leave the carbureter in such large globules that their travel is sluggish and they sooner or later come in contact with the walls of the manifold to which they cling and become more condensed. In addition to these heavy particles which are present in the mixture as it leaves the carbureter, further condensation in the manifold occurs as the result of the surface friction between the walls of the manifold and the stream of mixture traveling therethrough, and this condensation is greater in some manifolds than others by reason of sharp turns and bends, which impede the surface of the mixture, and also, because of pockets in the manifold which form eddies in which the velocity of the mixture is materially reduced and condensation consequently occurs. Furthermore, the amount of this unvaporized condensate, consisting principally of the heavier and relatively non-volatile ends of the fuel oil is becoming increasingly greater and more troublesome as the grade and character of commercial gasolene is decreased and its specific gravity is increased.

My present invention is designed not to supersede or improve the carbureter itself, but with a view of collecting the condensate which is delivered to or condenses in the manifold, and converting this liquid fuel by vaporization into a highly combustible gaseous mixture in which the fuel particles are thoroughly broken up into finely divided particles surrounded by sufficient air to support explosive combustion, and which is delivered to the cylinder in a turbulent condition favoring vaporization.

Another purpose of my invention is to not only convert the condensed and collected globules of fuel into a combustible mixture, but also to further break up and atomize the fuel particles traveling in the central portion of the stream from the carbureter to the cylinders, thus further perfecting the atomization over that accomplished by the carbureter itself.

Another object of my invention is to provide a device which can be quickly and easily installed without dismantling either the engine or carbureter and one which, when installed, will operate efficiently in any engine without adjustment or attention.

Other objects and advantages of my invention should be readily appreciated as the same becomes better understood, by reference to the following description when considered in connection with the accompanying drawings.

Referring to the drawings, Fig. 1 is a plan view of a gas engine equipped with my invention;

Fig. 2 is a transverse sectional view taken on the line 2—2 of Fig. 1;

Fig. 3 is an end view of the venturi employed; and

Fig. 4 is a sectional view on the line 4—4 of Figs. 2 and 3.

On the drawings, the engine block A is shown as provided with cylinders 1, in which the usual pistons 2 reciprocate, the cylinder being surrounded as is customary, by the water jacket 3 and communicating with the explosion chambers 4 to which the fuel mixture is admitted at predetermined intervals by the intake valves 5 and in which the mixture is ignited by the spark plugs 6. All of these parts and the other parts of the engine including the intake manifold 7 and the carbureter 8 may be of any well known or preferred construction and arrangement.

The manifold 7 is usually attached to the intake passage to each cylinder by means of bolts passing through the manifold flange and into the engine block, a gasket 9 being customarily interposed between the manifold and the block to prevent leakage, and as further assurance against leakage, a ring or sleeve fitting the interior of the manifold and the intake passage through the block is customarily disposed between the shoulder 11 of the block and an opposed shoulder 12 formed in the manifold. My present invention contemplates the removal of this ring or sleeve and the substitution in its place of a Venturi tube, indicated generally by reference character 13 and comprising an annular shoulder or flange 14 adapted to fit snugly in the groove between the shoulders 11 and 12, thus performing the function of the ring which it supplants, of sealing the joint between the manifold and the cylinder block.

This venturi, as will be observed from the drawings, fits snugly into the fuel supply passage of the cylinder block, but at its outer or intake end, it is externally shaped to provide outside the shoulder 14, a circumferential collecting chamber or passage 15 between the perimeter of the tube and the surrounding walls of the manifold. The liquid fuel globules and the condensate which tend to adhere to the walls of the manifold are trapped in their travel toward the cylinder in this chamber and flow by gravity to the bottom thereof. A duct or passage 16 establishes communication between the bottom of the chamber where the liquid fuel accumulates and the throat of the venturi, and through this passage, the collected fuel is delivered into the venturi at the point of maximum vacuum so that it is thoroughly broken up and converted into a gaseous combustible mixture.

Since some of the heaviest and least volatile condensation may still be unatomized after passage through the venturi, I have made provision for collecting such condensates and again subjecting them to the action of the venturi. The inner or delivery end of the venturi is accordingly made of reduced external diameter throughout the lower portion of its perimeter providing in effect a wide groove forming in conjunction with the adjacent wall of the intake passage a chamber in which such condensates after passage through the venturi may collect by gravity. A second duct 18 established communication between this chamber and the throat of the venturi through which the condensates are drawn into the Venturi throat and there further atomized. Highly non-volatile oil ends may be caught and repeatedly returned to the venturi until atomization thereof is complete.

In the operation of my invention, the mixture of air and fuel produced at the carbureter is drawn through the manifold and that portion remote from the manifold walls which is in more gaseous condition than the portion contiguous to the walls, is drawn into and through the throat of the venturi, the action of which as well as the speeding up of the mixture, causes an increased atomization and further breaking up of the fuel particles. That portion of the mixture traveling along the walls which contains fuel globules of various sizes resulting from non-volatile oil ends and from condensation in the manifold, becomes trapped in the channel or collecting chamber surrounding the intake end of the venturi whereupon it flows to the bottom of this passage and is then drawn by the action of the venturi through the passage 16 into the throat of the venturi, where it is thoroughly vaporized and delivered directly into the cylinder as a highly combustible mixture. Such particles as still remain in liquid condition after passage through the venturi collect by gravity in the passage 17 from which they are redelivered through duct 18 into the venturi.

It will be manifest that my invention can be economically manufactured and very readily installed in any gas engine; each cylinder being equipped with one of the converters, a thoroughly mixed homogeneous combustible mixture is insured to each cylinder and irregularities in the running of the engine which customarily results from the intermittent delivery of slugs of imperfectly vaporized fuel are thereby eliminated.

I claim:

1. An internal combustion engine including in combination a cylinder block having an intake passage, an intake manifold, means for directly securing said intake manifold to said cylinder block, and a venturi located in the passage in the intake manifold and cylinder block, means for rigidly securing said venturi in said passage, said venturi being formed so as to provide collecting chambers for the condensate in the fuel mixture both at the inner and outer ends of the venturi, and ducts connecting said collecting chambers with the throat of the venturi.

2. An internal combustion engine including in combination a cylinder block having an intake passage, an intake manifold, means for directly securing said intake manifold to said cylinder block, a venturi located in the fuel mixture passage in the intake manifold and cylinder block, said venturi having an annular projection between its ends adapted to be clamped by the means securing the intake manifold to the cylinder block, said venturi being formed so as to provide a collecting chamber for the condensate in the fuel mixture, and a duct connecting said collecting chamber with the throat of the venturi.

3. An internal combustion engine including in combination a cylinder block having an intake passage, an intake manifold, means for directly securing said intake manifold to said cylinder block, a venturi located in the fuel mixture passage in the intake manifold and cylinder block, said venturi having a centrally located annular projection adapted to fit tightly within and rigidly held by the walls of the intake manifold and the cylinder block, the receiving end of said venturi being spaced from the wall of the intake manifold to form a collecting chamber, and a duct leading from said collecting chamber to the throat of said venturi.

4. An internal combustion engine including in combination a cylinder block having an intake passage, an intake manifold, means for directly securing said intake manifold to said cylinder block, a venturi located in the fuel mixture passage in the intake manifold and cylinder block, said venturi having a centrally located annular projection adapted to fit tightly within and rigidly held by the walls of the intake manifold and the cylinder block, the receiving end of said venturi being spaced from the wall of the intake manifold to form a collecting chamber, and a duct leading from said collecting chamber to the throat of said venturi, the lower wall of the delivery end of said venturi being spaced from the wall of the cylinder block to form a collecting chamber, and a duct leading from said collecting chamber to the throat of the venturi.

5. An internal combustion engine including in combination a cylinder block having an intake passage, an annular recess formed in said block at the outer end of said passage, which recess is concentric with the center of said intake pasage, an intake manifold adapted to be secured directly to the cylinder block, a venturi having an annular projection adapted to fit said annular recess and be clamped therein by the means securing the intake manifold to the cylinder block, collecting chambers associated with said venturi and located both at the inner and outer ends thereof, and ducts leading from said collecting chambers to the throat of the venturi.

6. An internal combustion engine including in combination a cylinder block having an intake passage, an annular recess formed in said block at the other end of said passage, which recess is concentric with the center of said intake passage, an intake manifold adapted to be secured directly to the cylinder block, a venturi mounted horizontally within the intake manifold and having an annular projection adapted to fit said annular recess and be clamped therein by the means securing the intake manifold to the cylinder block, the delivery end of said venturi at the lower side thereof being spaced from the wall of the cylinder block to form a collecting chamber, and a duct leading from said collecting chamber to the throat of the venturi.

7. An internal combustion engine including in combination a cylinder block having an intake passage, an annular recess formed in said block at the outer end of said passage, which recess is concentric with the center of said intake passage, an intake manifold adapted to be secured directly to the cylinder block, a venturi having an annular projection adapted to fit said annular recess and be clamped therein by the means securing the intake manifold to the cylinder block, the delivery end of said venturi at the lower side thereof being spaced from the wall of the cylinder block to form a collecting chamber, and a duct leading from said collecting chamber to the throat of the venturi, said venturi having a portion projeting forwardly from the wall of the intake manifold so as to form a collecting chamber, and a duct leading from said collecting chamber to the throat of the venturi.

WILLIAM A. EDWARDS.